UNITED STATES PATENT OFFICE.

BIRGER FJELD HALVORSEN, OF CHRISTIANIA, NORWAY, ASSIGNOR TO NORSK HYDRO-ELEKTRISK KVAELSTOFAKTIESELSKAB, OF CHRISTIANIA, NORWAY.

PROCESS OF PRODUCING CONCENTRATED NITROUS GASES.

1,316,950.  Specification of Letters Patent.  Patented Sept. 23, 1919.

No Drawing.   Application filed September 4, 1918.   Serial No. 252,668.

*To all whom it may concern:*

Be it known that I, BIRGER FJELD HALVORSEN, a subject of the King of Norway, residing at Christiania, in the Kingdom of Norway, have invented certain new and useful Improvements in Processes of Producing Concentrated Nitrous Gases; and I do hereby declare the following to be a full, clear, and exact description of the invention, such as will enable others skilled in the art to which it appertains to make and use the same.

It is known to absorb diluted nitrous gases in bases or acids and, by a suitable treatment of the products so formed, to recover the gases in a more concentrated state or in the form of nitric acid.

These well-known methods have several drawbacks. Thus when using alkaline solutions as absorbents large quantities of liquid have to be evaporated. When absorbing in dry metal oxids, for instance in zinc oxid, these are usually of a so weakly basic nature that their absorbing effect is very small.

According to the present invention I use for the absorption a dry substance consisting of alkali metal hydroxids or oxids of alkaline earths and one or more other metal oxids. The addition of metal oxid is to enable a dissociation of the compounds formed by a succeeding heating process. In other words, the greater absorption power of the alkalies and the alkaline earth metal as well as the advantages of the easily decomposable metal compounds are utilized in the manner that the nitrous gases are brought into contact with a mixture of substances comprising a base in the form of oxids, hydroxids or carbonates and an oxid of a metal forming easily decomposable compounds with alkali and alkaline earth metals. The resulting product is then subjected to a decomposition treatment, whereby nitrogen oxids are expelled and the absorbent recovered. The result may be explained in that the metal oxids combine with the bases to form aluminates, ferrates, and similar compounds, whereby nitrogen oxids fixed by the bases are liberated.

The process may for instance be carried out in the following way:

Into an absorbing device I place the absorbent, which may for instance consists of a mixture of sodium hydroxid and ferric oxid or another metal oxid such as zinc oxid, aluminium oxid, etc. Preferably a plurality of absorbing devices are connected in series and the gases are passed through them according to the counter-current principle, so that the most concentrated gases may come into contact with the absorbent which has nearly finished its reacting effect, or absorption and the most diluted gases may come into contact with fresh absorbent. When the absorption in one device has been completed, it is cut out from the gas current, whereupon the contents are heated, and when desirable simultaneously a current of steam is blown through them, whereby dissociation of the formed compounds takes place. By the dissociation, nitric acid and concentrated nitrous gases are obtained in well-known manner. When the reaction is complete a powdery porous mass is obtained which may again be used for the absorption of new quantities of nitrous gases.

By operating in this manner a very good absorption is obtained, and from the succeeding dissociation concentrated nitrous gases are obtained which may easily be transformed into comparatively concentrated nitric acid. Thus the production of dilute nitrite-nitrate-solutions are obviated, which require the use of large quantities of steam in order to concentrate them.

The state in which the absorbing mass is used depends upon the working conditions, especially upon the apparatus and plant used. If stationary apparatuses are used, the absorbing substance should be used in the form of briquets, but if movable apparatuses are use the absorbing substance should be in a powdered state.

As a concrete example and by way of illustration only, selecting zinc oxid from those mentioned, and when the mixed gases enter an absorber containing a mixture of zinc oxid and, say for example, sodium hydrate as the alkali or base we have—

$$2NaOH + NO_2 + NO + ZnO = 2NaNO_2 + ZnO + H_2O$$

$$2NaOH + N_2O_4 + ZnO = NaNO_2 + NaNO_3 + ZnO + H_2O$$

The temperature of the gases not being too high the zinc oxid remains unaltered.

Heat is then applied to cause the base and oxid to combine and we have—

$$2NaNO_2 + ZnO = Zn(ONa)_2 + NO + NO_2$$

$$2NaNO_3 + ZnO = Zn(ONa)_2 + N_2O_5$$

Nitrous gases and sodium zincate are thus obtained. The gases are led off for use, and the residue, sodium zincate, is used over again at a lower temperature, acting as mixture of ZnO and $Na_2O$ as follows—

$$Zn(ONa)_2 + N_2O_4 = NaNO_2 + NaNO_3 + ZnO.$$

I claim:

1. Process of producing concentrated nitrous gases and nitric acid by absorbing diluted nitrous gases, which consists in passing dilute nitrous gases in contact with a dry mixture of substances comprising a dry base and an oxid of a metal forming easily decomposable compounds with alkaline and alkaline earth metal bases and subjecting the resulting product to a decomposition treatment.

2. Process of producing concentrated nitrous gases and nitric acid by absorbing diluted nitrous gases, which consists in passing dilute nitrous gases in contact with a dry mixture of substances comprising a dry base and a mixture of oxids forming easily decomposable compounds with alkaline and alkaline earth metal bases and subjecting the resulting product to a decomposition treatment.

3. Process of producing concentrated nitrous gases and nitric acid by absorbing diluted nitrous gases, which consists in passing dilute nitrous gases in contact with a dry mixture of substances comprising a dry base and an oxid of a metal forming easily decomposable compounds with alkaline and alkaline earth metal bases, and subjecting the resulting product to heating to such a temperature as to effect a decomposition of the compounds formed by the action of the nitrous gases upon the base referred to.

4. Process of producing concentrated nitrous gases and nitric acid by absorbing diluted nitrous gases, which consists in passing diluted nitrous gases in contact with a dry mixture of substances comprising a dry base and an oxid of a metal forming easily decomposable compounds with the base and subjecting the resulting product to a decomposition treatment in one and the same apparatus as that in which the absorption operation has taken place.

5. Process of producing concentrated nitrous gases and nitric acid by absorbing diluted nitrous gases, which consists in passing dilute nitrous gases in contact with a dry mixture of substances comprising caustic soda and ferric oxid, and subjecting the resulting product to a decomposition treatment.

6. Process of producing concentrated nitrous gases and nitric acid by absorbing diluted nitrous gases, which consists in passing dilute nitrous gases in contact with a dry mixture of substances comprising a dry base and an oxid of a metal forming easily decomposable compounds with the said base and subjecting the resulting product to a decomposition treatment, the resulting gaseous decomposition products being further treated to obtain nitric acid and nitrogen oxids.

7. Process of producing concentrated nitrous gases from dilute nitrous gases, which comprises passing said gases through a mixture of a dry base and an oxid of a metal capable of forming easily decomposable compounds with said base and at a temperature sufficiently low to cause no appreciable combination between the oxid and nitrous gases, then raising the temperature to cause the base and oxid to combine and simultaneously liberate gaseous nitrogen oxygen compounds, and utilizing the residue at a lower temperature for treating fresh quantities of dilute nitrous gases.

In testimony that I claim the foregoing as my invention, I have signed my name in presence of two subscribing witnesses.

BIRGER FJELD HALVORSEN.

Witnesses:
MEOGEUS BRIGGE,
ELISE POULSSON.